United States Patent

[11] 3,621,336

| [72] | Inventor | Wolfgang Angermeyer<br>Ittersbach Karlsruhe, Germany |
|------|----------|------|
| [21] | Appl. No. | 39,058 |
| [22] | Filed | May 20, 1970 |
| [45] | Patented | Nov. 16, 1971 |
| [73] | Assignee | Desco-Werk Seger & Angermeyer KG<br>Ittersbach Karlsruhe, Germany |

[54] CABLE REEL WITH MEANS FOR GUARDING AGAINST OVERHEATING OF CONVOLUTED CABLE
10 Claims, 3 Drawing Figs.

[52] U.S. Cl. .................................................. 317/40 R, 191/12.4
[51] Int. Cl. ................................................... H02h 5/04
[50] Field of Search .......................................... 191/12.4, 12.2 R; 317/40 R; 340/220

[56] References Cited
UNITED STATES PATENTS

| 1,357,900 | 11/1920 | Redmon | 191/12.4 UX |
| 3,200,274 | 8/1965 | Munier | 317/40 X |

FOREIGN PATENTS

| 271,227 | 1/1951 | Switzerland | 191/12.4 |

Primary Examiner—James D. Trammell
Attorney—Michael S. Striker

ABSTRACT: A reel for a supply of electric cable has hollow core accommodating a normally closed interrupter switch which is installed in the conductors of the cable between an energy source and one or more consumers. The interrupter switch opens when a temperature-responsive switch which is outwardly adjacent to or recessed into the core closes in response to detection of a predetermined maximum permissible temperature of convolutions which surround the core. The rise in temperature of the convolutions is caused by generation of heat in response to power losses due to conductor resistance.

Inventor
WOLFGANG ANGERHEYER 3,621,336

CABLE REEL WITH MEANS FOR GUARDING AGAINST OVERHEATING OF CONVOLUTED CABLE

BACKGROUND OF THE INVENTION

The present invention relates to devices for connecting a remote source of electrical energy with one or more consumers, particularly to reels for convoluted electric cable. More particularly, the invention relates to improvements in means for guarding against overheating of a supply of electric cable which is convoluted or otherwise stored on a reel, spool or a like support.

It is already known to provide a cable reel with a fuse which melts or with another overload protector which becomes operative when the strength of the current flowing through the conductor means of a cable exceeds a predetermined value. Such devices protect the withdrawn portion of the cable against overheating when the cable conducts current.

As a rule, at least a certain length of an electric cable which connects a remote energy source with one or more consumers is convoluted onto the core of a reel or an analogous support. Consequently, the convoluted portion of such cable is apt to store excessive amounts of heat well ahead of the time when the strength of the current exceeds a permissible value. The thus stored heat is likely to affect the convoluted portion of the cable, particularly as regards its useful life. For example, if the temperature of the space which surrounds the core of a reel and accommodates the convolutions of an electric cable rises to and thereupon remains at a certain value, the insulation of convoluted material is likely to become brittle and to ultimately permit short circuiting of the conductors. Attempts to counteract the detrimental effects of heat which is stored in the convolutions of an electric cable by increasing the diameter of the cable beyond that which is necessary for conveying of current at the average operating strength have met with limited success. Such measure is not only uneconomical but it also cannot eliminate premature destruction of insulation under the action of heat.

SUMMARY OF THE INVENTION

An object of the invention is to provide a cable reel or an analogous device for connecting an energy source with one or more consumers by way of an electric cable with novel and improved means for guarding against overheating of convoluted or otherwise stored portion of the cable to thus prevent premature destruction of insulating material and eventual short circuiting of conductors.

Another object of the invention is to provide simple, inexpensive, compact and reliable guarding means which can be readily installed within the confines of a customary cable reel or an analogous support for electric cable.

A further object of the invention is to provide guarding means which is effective not only when the reel or a like support stores a substantial supply of electric cable but also when the cable is partially paid out to connect an energy source with one or more remote consumers of electrical energy.

The invention is embodied in a device for connecting a source of electrical energy with at least one consumer which comprises an elongated electric cable including conductor means having end portions connectable with the energy source and with one or more consumers, a support arranged to store at least a portion of the cable whereby the temperature of the thus stored cable portion tends to rise in response to ohmic heating (namely, to heating which is caused by power losses due to conductor resistance), and means for guarding against excessive ohmic heating including normally closed interrupter switch contact means installed in the conductor means between the energy source and the consumer or consumers and detector means mounted in or on the support adjacent to the stored cable portion and operative to effect opening of the interrupter switch contact means when the temperature of stored cable portion rises to a predetermined value.

The support is preferably a reel having a hollow core which can accommodate the interrupter switch contact means. The detector means may include a temperature-responsive switch which is outwardly adjacent to or is embedded in a recess of the core. This temperature-responsive switch may be installed in a control circuit which is completed and causes opening of the interrupter switch contact means when the temperature-responsive switch closes in response to excessive ohmic heating of the stored cable portion.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
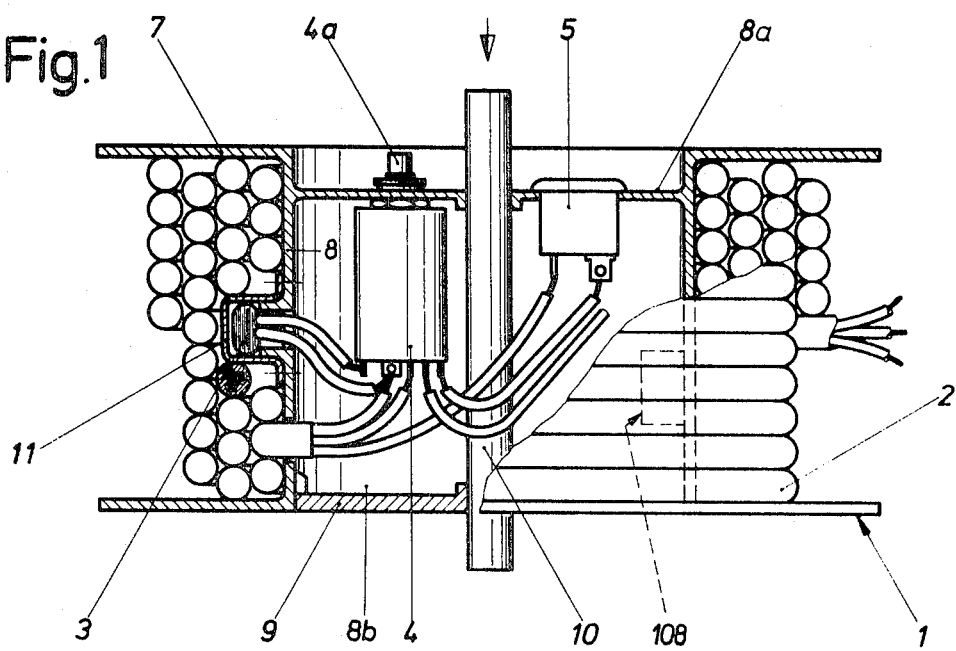
FIG. 1 is a partly elevational and partly axial sectional view of a cable reel forming part of a device which embodies the invention.
Figure 2:
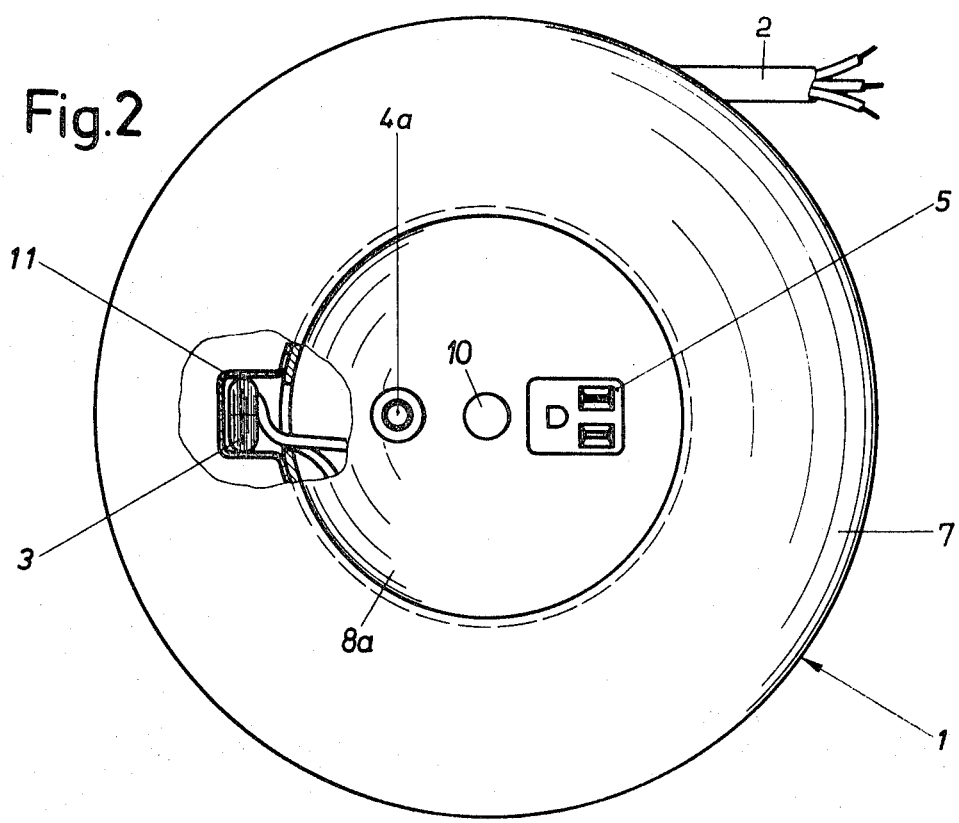
FIG. 2 is a plan view of the cable reel as seen in the direction of arrow A in FIG. 1.

Referring first to FIGS. 1 and 2, there is shown a device including a support or reel 1 having a hollow core 8 and two flanges 6 and 7. The flanges 6, 7 are integral with the core 8 and with a first end wall 8a which closes one axial end of the core and is adjacent to the plane of the flange 7. A removable second end wall 9 closes the other axial end of the core 8 and is flush with the flange 6. The core 8 is surrounded by a supply of convoluted electric cable 2. It is assumed that a certain length of the cable 2 is not convoluted around the core 8. For the sake of simplicity, only a few of the convolutions indicated in FIG. 1 are shown in full section. A shaft 10 is fixedly mounted in the end wall 8a coaxially with the core 8 and rotates with the reel 1 in a frame (not shown) when the latter collects or pays out the cable 2.

Figure 3:
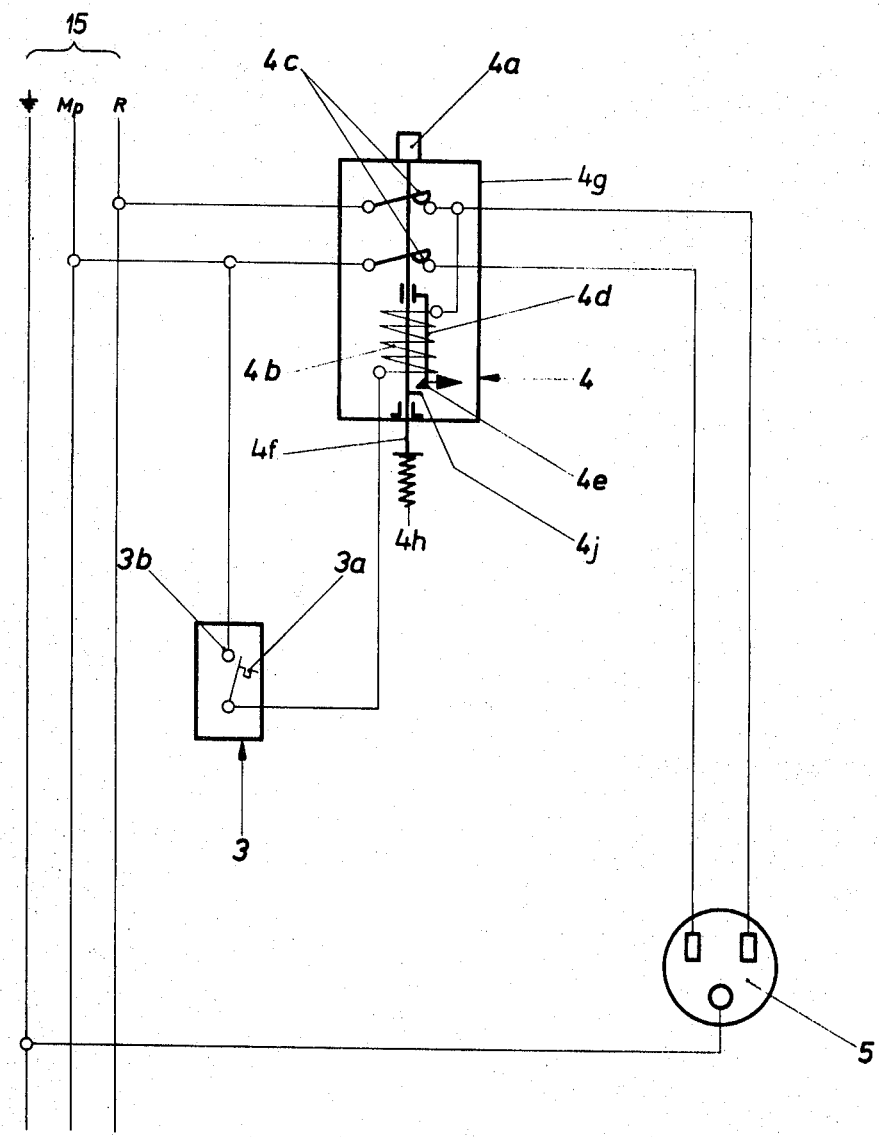
FIG. 3 is a circuit diagram of the means which guards against overheating of the convoluted portion of the electric cable.

The core 8 and its end walls 8a, 9 define an internal chamber 8b which accommodates certain elements of the improved means for guarding against overheating of the convoluted portion of the cable 2. These elements include a female connector or socket 5 which is mounted in the end wall 8a and a normally closed semiautomatic interrupter switch 4 which is mounted on the end wall 8a and can be closed by a manually depressible actuating member or knob 4a. The knob 4a is accessible at the outer side of the end wall 8a. The socket 5 and interrupter switch 4 are connected with the conductors of the cable 2 in a manner as shown in FIG. 3. The housing 4g of the interrupter switch 4 contains two normally closed movable contacts connected in two conductors which connect a source 15 of polyphase current with the socket 5. The housing 4g further accommodates a contact-opening rod 4f which is movable to the illustrated position in response to depression of the knob 4a to thereby close the contacts 4a. The rod 4f is pushed upwardly by a helical spring 4h or by other suitable biasing means which tends to open the contacts 4c. An arm 4j of the rod 4f is normally engaged by the projection 4e of a bimetallic blocking element 4d which is surrounded by an electric heating coil 4b. When the control circuit including the heating coil 4b is completed, the blocking element 4d moves its projection 4e radially of and away from the arm 4j so that the spring 4h can lift the rod 4f and thus opens the contacts 4c. Consequently, the electrical connection between the source 15 and one or more consumers (connected to the socket 5) is interrupted in automatic response to heating of the coil 4b. If the coil 4b heats the bimetallic element 4d so that the tooth 4e is held away from the path of the arm 4j, depression of the knob 4a will result in closing of contacts 4c but only as long as the knob 4a remains depressed because the spring 4h automatically opens the contacts 4c as soon as the finger pressure on the knob is terminated.

The means for completing the control circuit including the coil 4b comprises a temperature-responsive detector switch 3 mounted in a protective casing 11 (FIG. 1) which is outwardly adjacent to the core 8. The movable contact 3a of the switch 3 is a bimetallic element which engages the fixed contact 3b when the temperature in the casing 11 rises to a predetermined value, namely, at a temperature which could cause damage to the convoluted portion of the cable 2. It will be noted that the switch 3 does not respond to changes in current strength but rather to a predetermined temperature in the space which accommodates the convolutions of the cable 2. Such predetermined temperature is normally higher than the temperature of surrounding air so that the switch 3 does not close when the cable 2 is fully paid out. As explained above, closing of the switch 3 results in flexing of the blocking element 4d so that the contacts 4c in the housing 4g open and interrupt the flow of electric current from the source 15 to the consumer or consumers connected to the socket 5. A prerequisite for retention of contacts 4c in closed position (in response to manual depression of the knob 4a) is that the bimetallic element 3a of the detector switch 3 is cooled to below the aforementioned predetermined temperature to thus open the control circuit including the heating coil 4b. The projection 4a then returns into the path of movement of the arm 4j and prevents upward movement of the rod 4f under the action of the spring 4h.

The bimetallic element 4d constitutes but one of various blocking devices which can be used to normally prevent opening of the contacts 4c. For example, the element 4d can be influenced by a magnet which tends to pull it into the path of movement of the arm 4j. Also, an electromagnet can replace the coil 4b to serve as a means for moving its armature (blocking element) away from the path of the arm 4j in response to closing of the temperature-responsive switch 3.

It is clear that the improved device is susceptible of many additional modifications without departing from from the spirit of the present invention. For example, the casing 11 for the switch 3 can be installed in the chamber 8b. The core 8 is then provided with a suitable recess (as indicated in FIG. 2 at 108) which snugly receives the detector switch 3 or an analogous temperature-responsive circuit completing device. Switch 4 can be an automatic interrupter as known per se (without knob 4a and blocking element 4d).

The guarding means of the present invention is primarily designed to prevent excessive ohmic heating of convoluted or otherwise stored electric cables. The term "ohmic heating" is intended to denote such heating which is the result of power losses due to conductor resistance.

In its simplest form, the guarding means will comprise a temperature-responsive interrupter switch which maintains its contacts in closed position within a predetermined temperature range and includes or cooperates with detector means which determines the temperature in the space surrounding the core 8. This is a fully automatic interrupter switch. The switch 4 of FIG. 3 is semiautomatic because its contacts 4c must be closed by the knob 4a.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A device for connecting a source of electrical energy with at least one consumer, comprising an elongated electric cable including conductor means having end portions connectable with the energy source and with at least one consumer; a support arranged to store at least a portion of said cable whereby the temperature of the thus stored cable portion tends to rise in response to ohmic heating resulting from power losses due to conductor resistance; and means for guarding against excessive ohmic heating, including normally closed interrupter switch contact means installed in said conductor means and detector means mounted on said support adjacent to said cable portion and operative to effect opening of said interrupter switch contact means in response to a rise in the temperature of said stored cable portion to a predetermined value.

2. A device as defined in claim 1, wherein said support is a rotary reel having a core and wherein said portion of the cable is convoluted around said core.

3. A device as defined in claim 2, wherein said core is hollow and the interrupter switch contact means is installed in the interior of said core.

4. A device as defined in claim 1, wherein said means for guarding further comprises a normally open control circuit and said interrupter switch contact means is arranged to open in response to completion of said control circuit, said detector means comprising a temperature-responsive switch installed in and arranged to complete said control circuit when the temperature of said cable portion rises to said predetermined value.

5. A device as defined in claim 1, wherein said interrupter switch contact means forms part of a semiautomatic switch.

6. A device as defined in claim 1, wherein said interrupter switch contact means forms part of an automatic switch.

7. A device as defined in claim 1, wherein said support comprises a reel having a core and said portion of said cable is convoluted around said core, said detector means being outwardly adjacent to said core and being surrounded by said convolutions.

8. A device as defined in claim 1, wherein said support comprises a reel having a core and said portion of said cable is convoluted around said core, said detector means being installed in a recess provided in said core.

9. A device as defined in claim 1, further comprising socket means connected with one end portion of said conductor means and mounted in said support.

10. A device as defined in claim 1, wherein said source is a source of polyphase current.

* * * * *